(12) United States Patent
Arroyo et al.

(10) Patent No.: US 12,354,448 B2
(45) Date of Patent: Jul. 8, 2025

(54) GESTURE FLAGGING FOR ADVANCED SECURITY

(71) Applicant: Truist Bank, Charlotte, NC (US)

(72) Inventors: Yadhira Haydee Arroyo, Chicago, IL (US); Stephen Gary Hess, Palm Springs, CA (US); Nancy Wells, Kenosha, WI (US); LaTonja Barlow, Lenexa, KS (US); Sarah Katherine Nash, Raleigh, NC (US); Alex Heath Misiaszek, Cornelius, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/487,424

(22) Filed: Oct. 16, 2023

(65) Prior Publication Data

US 2024/0038030 A1 Feb. 1, 2024

Related U.S. Application Data

(63) Continuation of application No. 17/848,153, filed on Jun. 23, 2022, now Pat. No. 11,823,536.

(51) Int. Cl.
*G07F 19/00* (2006.01)
*G06F 3/0488* (2022.01)
*G07F 7/10* (2006.01)
*G08B 25/01* (2006.01)

(52) U.S. Cl.
CPC .......... *G07F 19/207* (2013.01); *G06F 3/0488* (2013.01); *G07F 7/10* (2013.01); *G07F 19/206* (2013.01); *G08B 25/014* (2013.01)

(58) Field of Classification Search
CPC ........ G07F 19/207; G07F 7/10; G07F 19/206; G06F 3/0488; G08B 25/014
USPC .......................................................... 235/379
See application file for complete search history.

(56) References Cited

U.S. PATENT DOCUMENTS

| | | | |
|---|---|---|---|
| 5,731,575 A | 3/1998 | Zingher et al. | |
| 6,062,474 A * | 5/2000 | Kroll | G06Q 40/02 235/382 |
| 9,501,923 B2 * | 11/2016 | Tijerina | G07F 9/026 |
| 9,679,197 B1 | 6/2017 | Sills et al. | |
| 10,949,652 B1 | 3/2021 | Cruz et al. | |
| 11,620,859 B2 | 4/2023 | Sills et al. | |
| 11,823,536 B1 * | 11/2023 | Arroyo | G06Q 20/4016 |
| 2016/0148488 A1 * | 5/2016 | Tijerina | G07F 9/026 705/325 |
| 2017/0069051 A1 * | 3/2017 | Petitt, Sr. | G06Q 50/265 |
| 2022/0214753 A1 | 7/2022 | Singh | |

* cited by examiner

*Primary Examiner* — Daniel A Hess
(74) *Attorney, Agent, or Firm* — Kilpatrick Townsend & Stockton LLP; Michael A. Springs, Esq.

(57) ABSTRACT

A method includes receiving a notification of the gesture from a sensing device, receiving an input from a user to select a banking transaction, and determining an intent of the gesture from the sensing device. Additionally, the method includes altering the banking transaction based on the input of the user and the intent of the gesture from the sensing device. The method further includes transmitting a request separate from the banking transaction based on the intent of the gesture.

20 Claims, 3 Drawing Sheets

GESTURE FLAGGING FOR ADVANCED SECURITY

CROSS-REFERENCE TO RELATED APPLICATIONS

This application is a continuation of U.S. patent application Ser. No. 17/848,153 filed on Jun. 23, 2022, and titled "GESTURE FLAGGING FOR ADVANCED SECURITY," the disclosure of which is hereby incorporated by reference in its entirety.

TECHNICAL FIELD

The present disclosure relates generally to transaction security and, more particularly (although not necessarily exclusively), to privately flagging transactions for advanced security.

BACKGROUND

Financial transactions can be made through a variety of devices, including automated teller machines (ATMs), point of sales (POS) devices, smartphones, and personal computers. The convenience afforded by such devices may be exploited by bad actors to access the credit and assets of legitimate banking customers.

SUMMARY

Presented is a system for detecting a transaction has been made under duress, flagging the transaction as such, and proceeding with the transaction. The system may include a sensing device for detecting a gesture indicating the transaction is being made under duress. The system may also include a processing device and a memory with instructions that may cause the processing device to receive the gesture and determine the intent of the gesture. The instructions within the memory may also cause the processor to receive an instruction to execute the transaction. The instructions may alter the banking transaction based on user input and the interpreted intent of the gesture. The instructions may also cause the processor to send a request separate from the banking transaction based on the intent of the gesture.

Also presented is a process for detecting a transaction has been made under duress. The process may involve receiving, at a transaction device, notification of a gesture from a sensing device. The process may further involve receiving an input from a user to select a banking transaction. The process may further involve determining, by the transaction device, an intent of the gesture from the sensing device. The process may further involve altering, by the transaction device, the banking transaction based on the input from the user and the intent of the gesture. The process may also involve transmitting a request separate from the banking transaction based on the intent of the gesture.

DETAILED DESCRIPTION

Certain aspects and examples of the present disclosure relate to privately flagging banking transactions as having been made under duress. A transaction may be privately flagged by an activity that may seem unremarkable to an observer but may have a pre-established meaning to a user under duress and a financial institution of the user. A banking transaction may include any exchange of money, credit, debt, property, voucher, or other assets where the transaction is facilitated by an electronic device.

Privately flagging a transaction as being made under duress at the time of the transaction may allow a transaction to occur for the sake of a banking client. A banking customer may be pressured to execute a transaction that may be illegitimate. For example, a banking customer may return a rental car and be charged for pre-existing damage to the car. The rental car business may not allow the customer to leave without paying for the pre-existing damage. The customer may privately flag the transaction as illegitimate and still go through the motions of paying the rental car business so the customer is permitted to leave. The customer can privately flag the transaction by a variety of means, dependent on the device they use to execute the transaction.

Privately flagging a transaction as being made under duress at the time of the transaction may bolster the case of the banking customer when disputing the transaction by providing a more accurate record of the incident than what may be available by reporting the incident after it occurs. Flagging the transaction may cause a device, such as an ATM or a smartphone, to compare the transaction to other transactions associated with a particular merchant, ATM location, or other relevant entity. In some examples, flagging the transaction may alert an investigatory body, such as a fraud department, which may result in the removal of a merchant from a credit card system. In some examples, flagging the transaction may alert a protective body, such as police or a private security company.

Transactions may be flagged as being made under duress with a variety of techniques. For example, transactions made with a smartphone may be flagged with at least one gesture input into a touchscreen of a smartphone. In some examples, transactions made at an ATM may use a secondary four-digit personal identification number (PIN) code, distinct from a primary PIN code.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
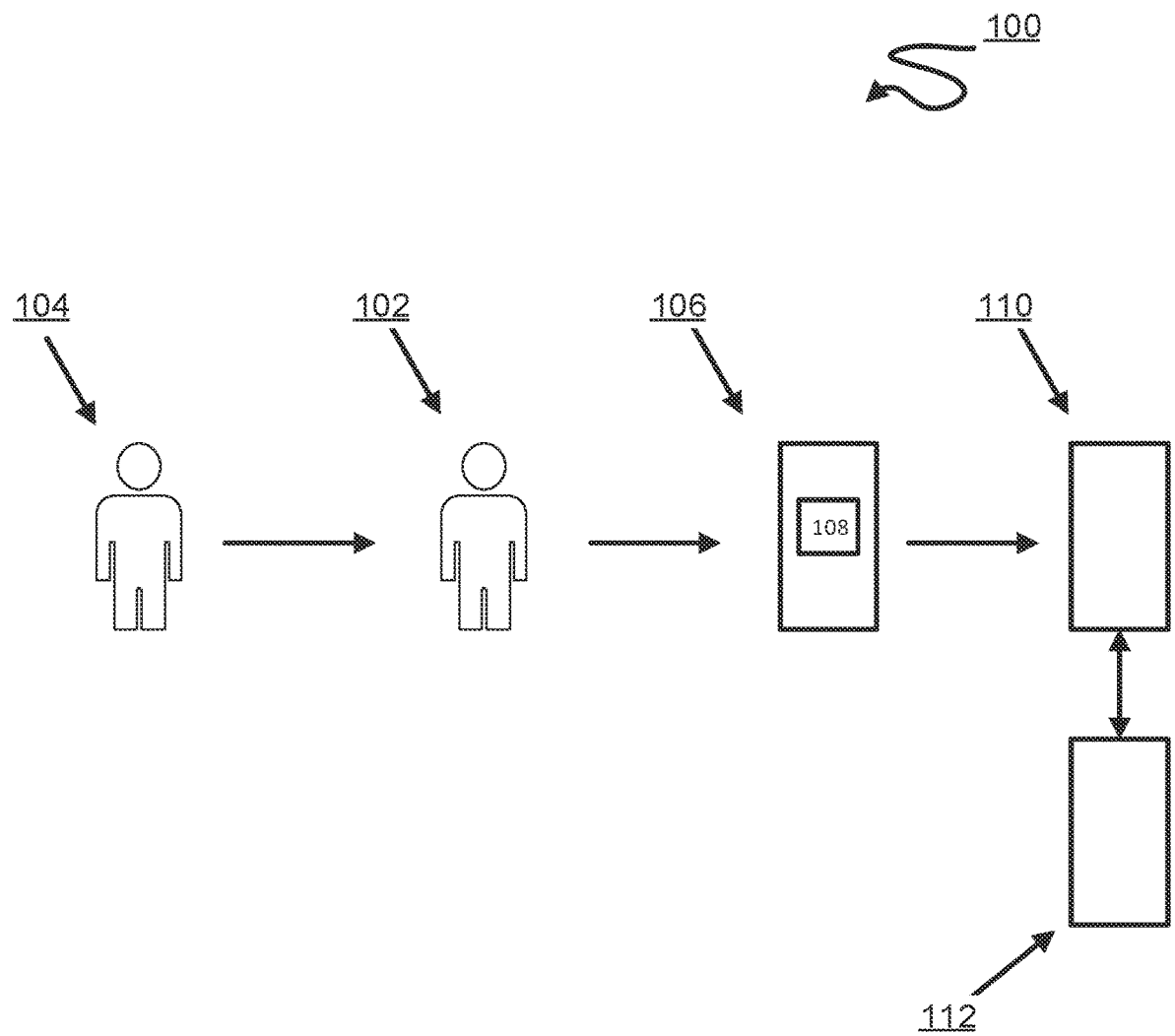
FIG. 1 is an example illustrative of a user flagging a transaction while under duress, according to one example of the present disclosure.

FIG. 1 is an example illustrative of a user 102 flagging a transaction 108 while under duress, according to one example of the present disclosure. An adversary 104 may place a user 102 under some form of duress to complete a financial transaction 108. For example, the adversary 104 may overcharge the user 102 for goods or services, charge the user 102 for incomplete, defective, or delayed goods or services, extort the user 102, or perpetrate any other kind of perceived fraud against the user 102 in relation to a financial transaction. Other examples of duress can include threats of violence, threats against personal liberty, extraordinary economic pressure, bad faith bargaining, nondisclosure of information material to a contract, or attempting to execute a contract with terms that are impossible to satisfy.

The user 102, in response to the duress, may privately flag the compelled transaction 108 via a transaction device 106. The transaction device 106 may be a smartphone, a tablet, a wearable device such as a smartwatch or headphones, an ATM, a laptop computer, a personal computer, a telephone, a point of sales device, a vending machine, or any other device suitable for executing a transaction 108. In some examples, the user 102 may privately flag their transaction 108 by altering their wet signature or an electronic signature at a point of sales device.

The user 102 may privately flag the transaction 108 with a variety of techniques, dependent on the capabilities of the transaction device 106. Non-limiting examples of privately flagging a transaction 108 with a device include the user 102 executing a pre-determined gesture on a touchscreen, navigating to a designated icon displayed on a graphical user interface, pressing or holding at least one button of the device, such as a volume button, tapping, shaking, or otherwise actuating accelerometers within the device, speaking a code word or code phrase, conveying a pre-determined facial expression or physical gesture to a front or rear facing camera of the device, entering an alternate PIN, entering an alternate username or password, entering a code word or code phrase, or altering a signature in a signature field. Other examples are also possible.

The user 102 may privately flag the transaction 108 in a gradation of severity. For example, the user 102 may privately flag the transaction 108 as being made under a low level of duress if a door-to-door salesman is especially insistent but is not attempting to commit a crime. As an alternative example, the user 102 may privately flag the transaction 108 as being made under a high level of duress if they are in the process of being robbed. The transaction device 106 may adjust a response in accordance with the level of duress. In the example of the insistent door-to-door salesman, the transaction device 106 may merely designate the transaction 108 as a pending charge that may prompt a user or a credit card company to further investigate the transaction at a later date (e.g., prior to the charge posting). Alternatively, the transaction device 106 may allow the charge, but prevent reoccurring charges to the same merchant. In the example of the robbery, the transaction device 106 may contact a protective body, such as police or private security, in addition to flagging the transaction 108. In some examples, a user's location may be provided to the protective body when the high level of duress signal is transmitted such that the protective body is able to locate the user. The transaction device 106 may assign a location to the flagged transaction 108 based on global positioning system (GPS) data, location data derived from cellular towers, an Internet Protocol (IP) address, audio recording from the device, video recording from the device, or any other suitable source of location data.

The transaction device 106 may transmit the flagged transaction 108 to a server 110. The server 110 may perform some or all of the aforementioned computations that occur after the transaction device 106 has flagged the transaction 108. The server 110 may compare the flagged transaction 108 to a database 112. The database 112 may have aggregated data from government entities, such as the Department of Justice, from non-profit entities, such as the Better Business Bureau, for-profit entities, such as Fidelity National Information Services, from review sources such as Glassdoor or Yelp, and from data related to other flagged transactions. The database 112 may also contain data entered by the user or a bank. For example, the user may have indicated they are travelling abroad before flagging a transaction. Other sources of data are also possible. The transaction device 106 or the server 110 may use the database 112 to assess the validity of the flagged transaction. The server 110 may also add information related to the flagged transaction 108 to the database.

In some examples, the server 110 may determine whether the flagged transaction 108 is for an actual good, or a good of a certain value. This may be done to prevent abuse of the transaction flagging process, thereby protecting merchants when appropriate.

Figure 2:
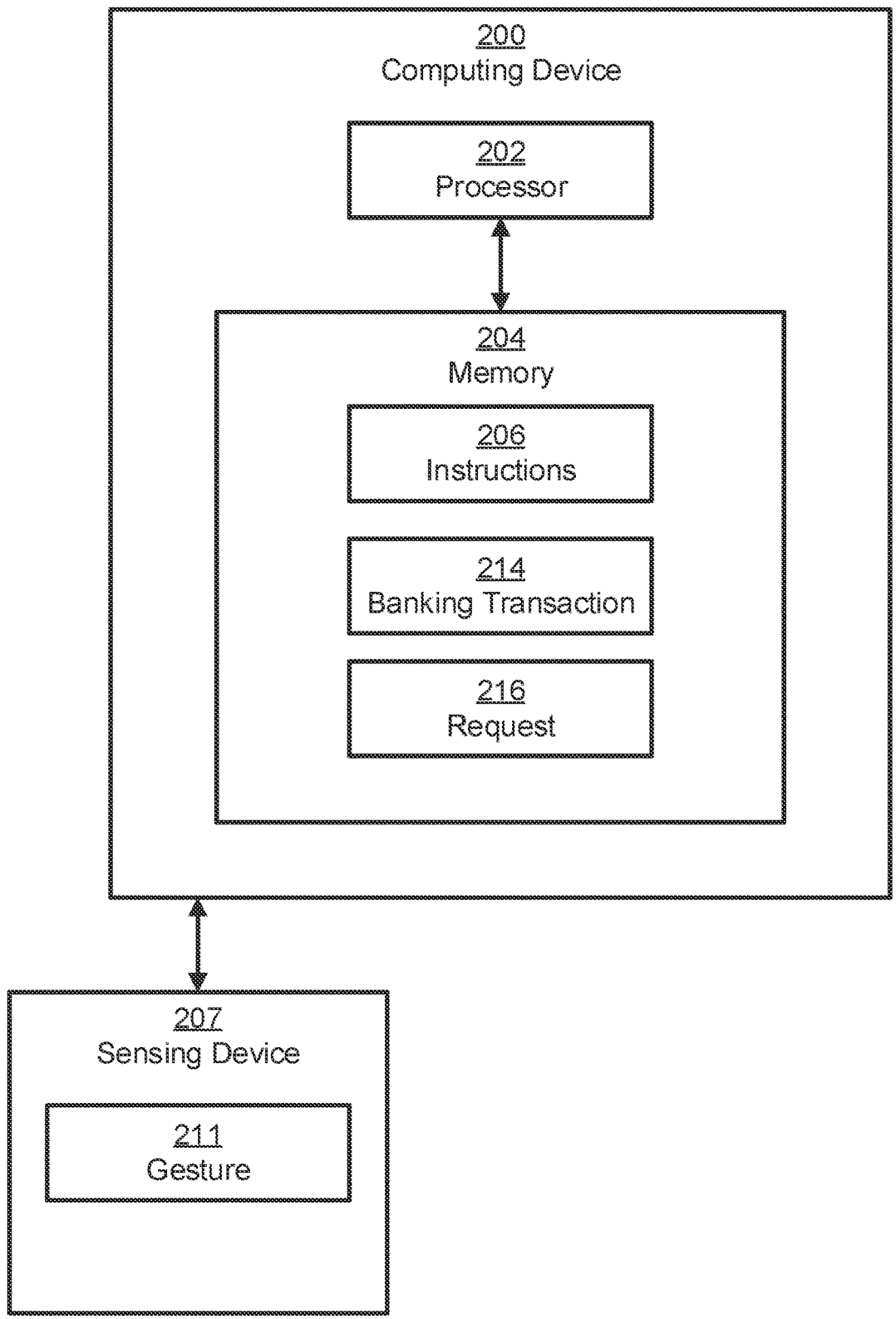
FIG. 2 is a block diagram of an example computing device according to one example of the present disclosure.

FIG. 2 is a block diagram of an example computing device according to one example of the present disclosure. The computing device 200 includes a processor 202 that is communicatively coupled to a memory 204. In some examples, the processor 202 and the memory 204 may be distributed from (e.g., remote to) one another.

The processor 202 can include one processing device or multiple processing devices. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in a suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory, computer-readable medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

The memory 204 may further include at least one banking transaction 214. The banking transaction 214 may be instructions for performing any withdrawal, deposit, transfer, or other suitable exchange of money, credit, debt, property, voucher, or other asset. The executed banking transaction 214 may be any action or series of actions that can be executed with an ATM, with a mobile banking application, with a banking website, or with a point of sales device.

The memory may include instructions relating to generation of a request 216 that is distinct from the banking transaction 214. The request 216 may alert an investigatory body of a credit card provider or banking system, such as a fraud department. The request may also alert a protective body, such as police.

The computing device 200 may be communicatively coupled to a sensing device 207. The sensing device may be a touchscreen, a number pad, a keyboard, a graphics tablet, a point of sales device, a camera, an accelerometer, a gyroscope, a magnetometer, an ultrasonic transducer, a subsonic transducer, an infrared input, a servomotor, a microphone, or any combination of buttons, switches, dials, sliders, or touch sensor strips. The sensing device 207 may detect a gesture 211. The gesture may actuate at least one of the aforementioned examples of a sensing device 207. The gesture may be comprised of multiple actuations of any of the aforementioned examples of a sensing device 207. The gesture may be comprised of any combination of actuations of the aforementioned examples of a sensing device 207.

Figure 3:
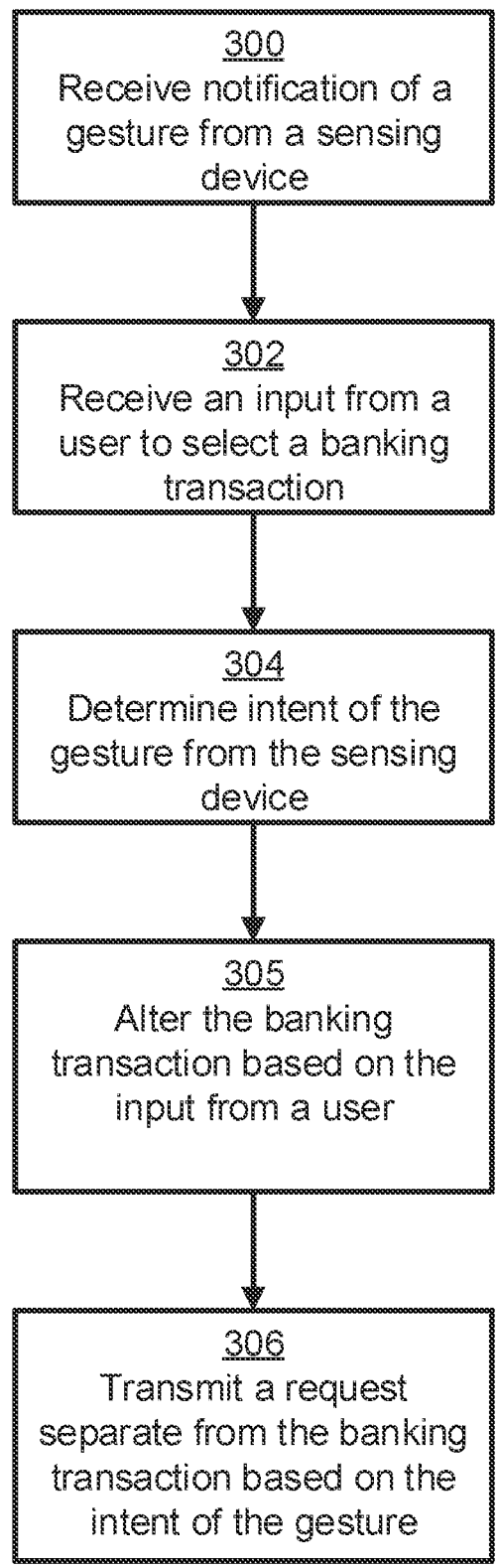
FIG. 3 is a flowchart of an example of a process for implementing some aspects of the present disclosure.

FIG. 3 is a flowchart of an example of a process for implementing some aspects of the present disclosure. At block 300 the computing device 200 may receive a notification of a gesture 211 from a sensing device 207. The gesture 211 may be any gesture recognized by a gesture system, such as OneUI released by Samsung. The gesture 211 may be at least one swipe, tap, or drawn shape entered into a touchscreen, wherein the touchscreen is the sensing device 207. The gesture 211 may be a duration dependent interaction with a touchscreen, such as contacting a portion of a touchscreen for a period of time or moving a finger, fingers, a stylus, or other suitable means of interaction across a touchscreen at a controlled pace. The gesture 211 may require a combination of physical inputs on a touchscreen at the same time, such as a pinching or spreading motion between fingers.

The gesture 211 may be defined as navigating to an icon or user interface item. The icon or user interface item may be intentionally mislabeled to maintain privacy. The gesture 211 may involve inputs into the buttons or switches of a smartphone, tablet, laptop computer, or similar device. The gesture 211 may involve inputs into the buttons or switches of a device communicatively coupled a smartphone, tablet, laptop computer, or similar device. For example, a transaction executed primarily through a smartphone may be privately flagged by a series of inputs into the volume buttons of a headset in communication with the smartphone.

The gesture 211 may be at least one accelerometer input, gyroscopic input, magnetometer input, ultrasonic input, subsonic input, infrared input, or motion control input from the smartphone, smartwatch, laptop computer, or other suitable device. For example, the gesture 211 may involve shaking a smartphone or tapping a portion of a smartphone that is not the touchscreen. The gesture 211 may be at least one accelerometer input from a device communicatively coupled to the smartphone, smartwatch, laptop computer, or other suitable device. For example, the gesture 211 may be movement detected from a communicatively coupled headset or earphones.

The gesture 211 may be a motion or behavior displayed in view of a camera of a smartphone, laptop computer, ATM security camera, or other suitable device. The gesture 211 may be a code word, code phrase, or any other suitable utterance. The gesture 211 may be an interaction with a servomotor.

The gesture 211 may be a combination of any of the aforementioned example gestures. For example, the gesture 211 may be a shape drawn on the screen of a smartphone while a volume button of the smartphone is depressed.

The gesture 211 may be the use of an alternate PIN, an alternate username, or an alternate password. The gesture 211 may be an alteration to a signature entered into a signature field displayed on a screen.

The gesture 211 may be periodically updated from a prompt issued to a user by the computing device 200. For example, the computing device 200 may instruct a user to enter a new gesture every three months.

At block 302, the computing device 200 may receive an input from a user to select a banking transaction 214. In some examples, the computing device 200 may receive the input from a user to select a banking transaction 214 before receiving notification of a gesture 211 from a sensing device 207. The input from the user may include swiping a credit card, initiating an electronic funds transfer, or any other input that may be provided by the user to initiate a transaction. In some examples, the input from the user to select the banking transaction may be performed within a predetermined amount of time of the receipt of the notification of the gesture 211 at block 300.

At block 304, the computing device 200 may determine the intent of the gesture 211 from the sensing device 207. The computing device 200 may parse innocuous inputs and gestures from gestures designated to flag a banking transaction 214. The computing device 200 may determine a category or a severity of a flag attributed to a banking transaction 214. For example, a particular gesture may be designated to allow a banking transaction 214 while blocking future banking transactions with a particular merchant. The aforementioned example scenario may be useful in accepting a charge to initiate a subscription while effectively automatically cancelling the subscription. As an alternative example, the gesture 211 may be designated to allow a banking transaction 214 while alerting an investigatory body, such as a fraud department, or a protective body, such as police or a private security company.

At block 305, the computing device 305 may alter the banking transaction 214 based on input from the user. In some examples, the banking transaction 214 may be altered to an authorization hold. An authorization hole may be a service provided by a financial institution in which the financial institution places a hold on an amount of funds specified by the request 216 until the financial institution completes a settlement of the transaction. After a settlement, an obligation of all the parties may have been discharged and the financial transaction may be considered complete.

At block 306 the computing device 200 may transmit a request 216 separate from the banking transaction 214 based on the notification of the gesture. For example, in the case of a gesture 211 designated to allow the banking transaction 214 while alerting a protective body, the computing device 200 may contact the protective body. In some examples, the computing device 200 may relay the location of said computing device 200. In some examples, the computing device 200 may begin recording images, video, sounds, accelerometer data, facial recognition data, user inputs, or any other information that can be recorded from the computing device 200.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
  receiving, at a server, a notification of a gesture from a gesture sensing device in communication with a transaction device and an input from a user related to a banking transaction, wherein the gesture sensing device comprises a touchscreen arranged to receive contact with at least one physical object across at least a portion of the touchscreen as the gesture;
  determining, by the server, an intent of the gesture from the gesture sensing device, the gesture flagging the banking transaction as being made by the user under a particular level of duress;

validating the flagged banking transaction by comparing the flagged banking transaction to aggregated data comprising data related to other transactions; and altering, by the transaction device, a response associated with the flagged banking transaction based on the validity and the particular level of duress associated with the flagged banking transaction.

2. The method of claim 1, further comprising placing an authorization hold on the banking transaction to alter the banking transaction based on the input from the user.

3. The method of claim 1, wherein the gesture comprises an alteration to a signature of the user that distinguishes the gesture from the signature designated for executing the banking transaction without altering the banking transaction.

4. The method of claim 1, further comprising transmitting, by the server, a distress signal to police or a private security company as the response associated with the banking transaction.

5. The method of claim 1, further comprising transmitting, by the server, a signal to commence video recording, by the transaction device, subsequent to determining the intent of the gesture.

6. The method of claim 1, further comprising:
determining a location of the user based on the location of the transaction device; and
transmitting a message to authorities, wherein the message comprises the location of the user.

7. The method of claim 1, further comprising sending a message to the user instructing the user to provide an updated gesture, wherein the message is sent in response to a predefined amount of time having passed.

8. A non-transitory computer-readable medium comprising program code that is executable by one or more processors for causing the one or more processors to:
receive a notification of a gesture from a gesture sensing device in communication with a transaction device and an input from a user related to a banking transaction, wherein the gesture sensing device comprises a touchscreen arranged to received contact with at least one physical object across at least a portion of the touchscreen as the gesture;
determine an intent of the gesture from the gesture sensing device, the gesture flagging the banking transaction as being made by the user under a particular level of duress;
validating the flagged banking transaction by comparing the flagged banking transaction to aggregated data comprising data related to other transactions; and
alter a response associated with the flagged banking transaction based on the validity and the particular level of duress associated with the flagged banking transaction.

9. The non-transitory computer-readable medium of claim 8, wherein the program code is further executable by the one or more processors for causing the one or more processors to place an authorization hold on the banking transaction to alter the banking transaction.

10. The non-transitory computer-readable medium of claim 8, wherein the gesture comprises an alteration to a signature of the user that distinguishes the gesture from the signature designated for executing the banking transaction without altering the banking transaction.

11. The non-transitory computer-readable medium of claim 8, wherein the program code is further executable by the one or more processors for causing the one or more processors to transmit a distress signal to police or a private security company as the response associated with the banking transaction.

12. The non-transitory computer-readable medium of claim 8, wherein the program code is further executable by the one or more processors for causing the one or more processors to transmit a signal to commence video recording, by the transaction device, subsequent to determining the intent of the gesture.

13. The non-transitory computer-readable medium of claim 8, wherein the program code is further executable by the one or more processors for causing the one or more processors to:
determine a location of the user based on the location of the transaction device; and
transmit a message to authorities, wherein the message comprising the location of the user.

14. The non-transitory computer-readable medium of claim 8, wherein the program code is further executable by the one or more processors for causing the one or more processors to send a message to the user instructing the user to provide an updated gesture, wherein the message is sent in response to a predefined amount of time having passed.

15. A server comprising:
a processing device; and
a non-transitory computer-readable medium comprising program code that is executable by one or more processors for causing the one or more processors to:
receive a notification of a gesture from a gesture sensing device in communication with a transaction device and an input from a user related to a banking transaction, wherein the gesture sensing device comprises a touchscreen arranged to receive contact with at least one physical object across at least a portion of the touchscreen as the gesture;
determine an intent of the gesture from the gesture sensing device, the gesture flagging the banking transaction as being made by the user under a particular level of duress;
validating the flagged banking transaction by comparing the flagged banking transaction to aggregated data comprising data related to other transactions; and
alter a response associated with the flagged banking transaction based on the validity and the particular level of duress associated with the flagged banking transaction.

16. The server of claim 15, wherein the program code is further executable by the one or more processors for causing the one or more processors to place an authorization hold on the banking transaction to alter the banking transaction.

17. The server of claim 15, wherein the gesture comprises an alteration to a signature of the user that distinguishes the gesture from the signature designated for executing the banking transaction without altering the banking transaction.

18. The server of claim 15, wherein the program code is further executable by the one or more processors for causing the one or more processors to transmit a distress signal to police or a private security company as the response associated with the banking transaction.

19. The server of claim 15, wherein the program code is further executable by the one or more processors for causing the one or more processors to transmit a signal to commence video recording, by the transaction device, subsequent to determining the intent of the gesture.

20. The server of claim 15, wherein the program code is further executable by the one or more processors for causing the one or more processors to determine a location of the user based on the location of the transaction device.

* * * * *